United States Patent
Li et al.

(10) Patent No.: US 9,854,550 B2
(45) Date of Patent: Dec. 26, 2017

(54) SYNCHRONIZATION METHOD AND BASE STATION

(71) Applicant: Huawei Technologies Co., Ltd., Shenzhen (CN)

(72) Inventors: Yang Li, Shenzhen (CN); Qiang Li, Shenzhen (CN); Liang Xia, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 154 days.

(21) Appl. No.: 14/812,586

(22) Filed: Jul. 29, 2015

(65) Prior Publication Data

US 2015/0334670 A1 Nov. 19, 2015

Related U.S. Application Data

(63) Continuation of application No. PCT/CN2013/071074, filed on Jan. 29, 2013.

(51) Int. Cl.
*H04W 56/00* (2009.01)
*H04W 72/04* (2009.01)
*H04L 5/14* (2006.01)

(52) U.S. Cl.
CPC ........... *H04W 56/0015* (2013.01); *H04L 5/14* (2013.01); *H04W 72/042* (2013.01)

(58) Field of Classification Search
CPC ........... H04W 56/0015; H04W 56/001; H04W 92/20; H04W 84/20; H04W 56/0025;

(Continued)

(56) References Cited

U.S. PATENT DOCUMENTS

2007/0014269 A1* 1/2007 Sherman ............... H04W 48/12
370/338
2009/0122782 A1* 5/2009 Horn ................... H04W 56/001
370/350

(Continued)

FOREIGN PATENT DOCUMENTS

CN 101754351 A 6/2010
CN 101873688 A 10/2010

(Continued)

OTHER PUBLICATIONS

Leng, Xiaobing et al., "A Frame Structure for Mobile Multi-Hop Relay with Different Carrier Frequencies," IEEE 802.16, Session #40, Vancouver, Canada, 2005, 8 pages.

*Primary Examiner* — Paul H Masur
*Assistant Examiner* — Michael Phillips
(74) *Attorney, Agent, or Firm* — Brinks Gilson & Lione

(57) ABSTRACT

The present invention provide a synchronization method and base station, and the method includes: determining, by a base station, a synchronization status of the base station itself, where the synchronization status includes: a synchronized base station, or, a synchronization source base station; and configuring, by the base station, according to the determined synchronization status of the base station itself, a synchronization reference signal of the base station, in order that a first time is different from a second time, where the first time is a time when the synchronization reference signal of the base station is transmitted, and the second time is a time when an inter-station synchronization reference signal of the base station's synchronization source base station is transmitted. The embodiments of the present invention can improve the synchronization performance.

18 Claims, 4 Drawing Sheets

(58) Field of Classification Search
CPC ............. H04W 72/042; H04W 56/002; H04W 84/045; H04W 24/02; H04W 72/0446; H04W 84/18; H04W 24/10; H04W 48/10; H04W 48/12; H04W 72/04; H04W 88/08; H04W 16/32; H04L 5/14; H04L 5/0048; H04L 5/0053; H04L 5/005; H04L 5/0073; H04L 27/2655; H04L 5/0032

See application file for complete search history.

(56) References Cited

U.S. PATENT DOCUMENTS

| | | | |
|---|---|---|---|
| 2010/0027694 A1 | 2/2010 | Touboul et al. | |
| 2010/0074180 A1* | 3/2010 | Palanki | H04W 56/0015 370/328 |
| 2010/0260169 A1* | 10/2010 | Gheorghiu | H04W 56/0015 370/350 |
| 2011/0149813 A1 | 6/2011 | Parkvall et al. | |
| 2011/0176461 A1 | 7/2011 | Astely et al. | |
| 2013/0010668 A1* | 1/2013 | Lin | H04W 56/0015 370/312 |
| 2013/0185373 A1* | 7/2013 | Vandwalle | H04W 56/0015 709/208 |
| 2014/0204809 A1* | 7/2014 | Kim | H04J 13/0062 370/280 |
| 2014/0369243 A1* | 12/2014 | Guo | H04W 56/0015 370/280 |
| 2015/0043369 A1* | 2/2015 | Kim | H04J 11/005 370/252 |

FOREIGN PATENT DOCUMENTS

| | | |
|---|---|---|
| CN | 102625439 A | 8/2012 |
| WO | WO 2009/008681 A2 | 1/2009 |
| WO | WO 2010/074421 A2 | 7/2010 |

* cited by examiner

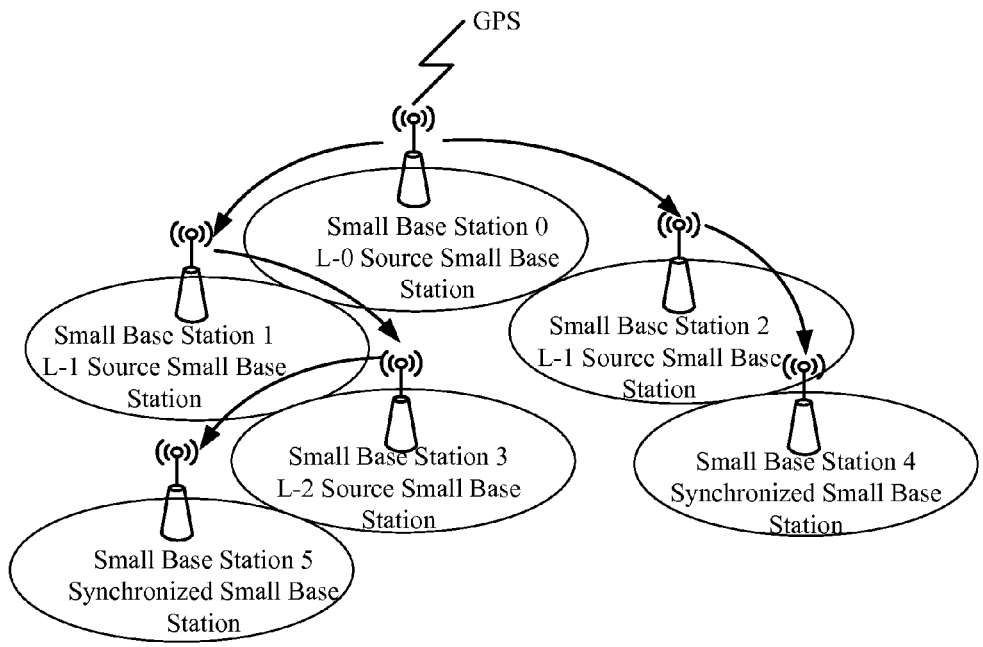

A base station determines a synchronization status of the base station itself, where the synchronization status includes: a synchronized base station, or, a synchronization source base station ⟶ 21

↓

The base station, configures a synchronization reference signal of the base station, according to the determined synchronization status of the base station itself, in order that a first time is different from a second time, where the first time is a time when the synchronization reference signal of the base station is transmitted, and the second time is a time when a synchronization reference signal for inter-station synchronization of the base station's synchronization source base station is transmitted ⟶ 22

FIG. 2

SYNCHRONIZATION METHOD AND BASE STATION

CROSS-REFERENCE TO RELATED APPLICATION

This application is a continuation of International Application No. PCT/CN2013/071074, filed on Jan. 29, 2013, which is hereby incorporated by reference in its entirety.

TECHNICAL FIELD

The present invention relates to communication technologies and, in particular, to a synchronization method and a base station.

BACKGROUND

In order to meet traffic demand of mobile data service, it is possible to densely deploy small cells in some hotspots indoor or outdoor, on the basis of conventional macro base stations cellular networks. The small cells have characteristics of small coverage, low transmission power, which are suitable for providing high speed data transmission service, performing splitting flow of data for the macro cellular networks, and reducing the network deployment cost of operators. The forms of small cells may include: multi-carrier cell (Metro cell), Micro cell, Pico cell, Femto cell, or wireless local area network (Wireless Local Area Network, WLAN) which uses wireless fidelity (Wireless Fidelity, WiFi) technology and etc., and different forms of wireless network access nodes which are used by small cells can be generally referred to as small base stations.

In order to transmit data normally, a small base station needs to be synchronized, meanwhile, the small base station also should provide downlink synchronization to user equipments (User Equipment, UE) in its cells. In the prior art, small base stations use the same configuration to transmit synchronization reference signal to realize inter-station synchronization and UE downlink synchronization. Since a small base station cannot transmit and receive at the same time at the same frequency, the synchronization reference signal, which is received by a small station, for inter-station synchronization sent by other small stations and the synchronization reference signal sent by the small station to a UE in its cell for UE downlink synchronization need to be separated by at least one transmission period of a synchronization reference signal, and when the period is relatively long, it would cost a relatively long time to achieve the inter-station synchronization and UE downlink synchronization, which undoubtedly would influence timing synchronization performance.

SUMMARY

In view of this, embodiments of the present invention provides a synchronization method and base station, to solve the problem of poor synchronization performance existed in the prior art.

A first aspect, provides a synchronization method, including:

determining, by a base station, a synchronization status of the base station itself, where the synchronization status includes: a synchronized base station, or, a synchronization source base station; and configuring, by the base station, a synchronization reference signal of the base station according to the determined synchronization status of the base station itself, in order that a first time is different from a second time, where the first time is a time when the synchronization reference signal of the base station is transmitted, and the second time is a time when an inter-station synchronization reference signal of the base station's synchronization source base station is transmitted.

Combining the first aspect, in a first possible implementation of the first aspect, the configuring the synchronization reference signal of the base station, includes:

when the base station is a synchronization source base station, configuring the synchronization reference signal of the base station to include a user equipment UE downlink synchronization reference signal of the base station and an inter-station synchronization reference signal of the base station, the UE downlink synchronization reference signal of the base station and the inter-station synchronization reference signal of the base station are transmitted at different times, the UE downlink synchronization reference signal of the base station and the inter-station synchronization reference signal of the base station's synchronization source base station are transmitted at different times, and the inter-station synchronization reference signal of the base station and the inter-station synchronization reference signal of the base station's synchronization source base station are transmitted at different times; and when the base station is a synchronized base station, configuring the synchronization reference signal of the base station to include a UE downlink synchronization reference signal of the base station, and the UE downlink synchronization reference signal of the base station and an inter-station synchronization reference signal of the base station's synchronization source base station are transmitted at different times;

where the inter-station synchronization reference signal of the base station's synchronization source base station is a synchronization reference signal which is used for inter-station synchronization among synchronization reference signals of the base station's synchronization source base station.

Combining the first possible implementation of the first aspect, in a second possible implementation of the first aspect, the synchronization reference signals of the base station's synchronization source base station further include a UE downlink synchronization reference signal of the base station's synchronization source base station, and where the configuring the synchronization reference signal of the base station, further includes:

configuring the UE downlink synchronization reference signal of the base station to be transmitted at a same time when the UE downlink synchronization reference signal of the base station's synchronization source base station is transmitted.

Combining the first or the second possible implementation of the first aspect, in a third possible implementation of the first aspect, all of the following parameters of the UE downlink synchronization reference signal and the inter-station synchronization reference signal are the same, or at least one of the following parameters thereof is different:

sequence generation formula, sequence length, transmitting power, and frequency-domain resource mapping pattern.

Combining the first aspect, in a fourth possible implementation of the first aspect, where the configuring, the synchronization reference signal of the base station, includes:

configuring the synchronization reference signal of the base station to be transmitted at a time different from when a synchronization reference signal of the base station's synchronization source base station is transmitted, where the synchronization reference signal is used for UE downlink synchronization and inter-station synchronization.

Combining any one of the first to the fourth possible implementation of the first aspect, in a fifth possible implementation of the first aspect, where the synchronization status further includes a synchronization level, and the configuring, the synchronization reference signal of the base station, further includes:

when the synchronization level of the base station is different from the synchronization level of another base station, and the difference value is minor than a preset threshold which is bigger than 1, configuring the synchronization reference signal of the base station to be transmitted at a time different from when a synchronization reference signal of the other base station is transmitted; or, when the difference value of the synchronization level of the base station and the synchronization level of the other base station is bigger than or equal to a preset threshold which is bigger than 1, configuring the synchronization reference signal of the base station to be transmitted at the same time when a synchronization reference signal of the other base station is transmitted; or, when the synchronization level of the base station and the synchronization level of the other base station are the same, configuring the synchronization reference signal of the base station to be transmitted at the same time or at a time different from when a synchronization reference signal of the other base station is transmitted.

Combining the fifth possible implementation of the first aspect, in the sixth possible implementation of the first aspect, where when the synchronization reference signal of the base station and the synchronization reference signal of the other base station, which has the same synchronization level with that of the base station, are transmitted at the same time, the configuring, the synchronization reference signal of the base station, further includes:

configuring the synchronization reference signal of the base station to be a sequence which is mutually orthogonal with that of the synchronization reference signal of the other base station; or, configuring the synchronization reference signal of the base station to be the same sequence with that of the synchronization reference signal of the other base station.

Combining the first aspect or any one of the first to the fourth possible implementation of the first aspect, in a seventh possible implementation of the first aspect, where the determining, by a base station, a synchronization status of the base station itself, includes:

after the base station receiving a notification signaling sent from another base station, determining the base station itself as a synchronization source base station; and when the base station does not receive a notification signaling sent from another base station, determining the base station itself as a synchronized base station;

where the other base station is a base station which takes the present base station as a synchronization source base station.

Combining the seventh possible implementation of the first aspect, in the eighth possible implementation of the first aspect, where the synchronization status further includes a synchronization level, and the determining, by a base station, a synchronization status of the base station itself, further includes:

when the base station is a synchronization source base station, determining a synchronization level of the base station itself according to the synchronization level of the base station's synchronization source base station, where a difference value of the synchronization level of the base station and the synchronization level of the base station's synchronization source base station is 1.

Combining the first aspect or any one of the first to the eighth possible implementation of the first aspect, in a ninth possible implementation of the first aspect, further including:

detecting periodically, by the base station, a synchronization obtaining reference signal, and reselecting the base station's synchronization source base station according to the synchronization obtaining reference signal detected; or, after reselecting the synchronization source base station, transmitting, by the base station, a signaling for releasing a synchronization relationship to the previously selected synchronization source base station; or, after being taken as a synchronization source base station and detecting that all synchronization relationships of the base station itself are released, transferring, by the base station, the synchronization status of the base station itself from the synchronization source base station to the synchronized base station; or, after being taken as a synchronized base station and receiving a notification signaling from another base station, transferring, by the base station, the synchronization status of the base station itself from the synchronized base station to the synchronization source base station, where the other base station is a base station which takes the present base station as a synchronization source base station.

Combining the first aspect or any one of the first to the ninth possible implementation of the first aspect, in a tenth possible implementation of the first aspect, not transmitting, by the base station, a downlink signal of a cell where the base station is located, at a time when the base station receiving the inter-station synchronization reference signal of the base station's synchronization source base station; or, not transmitting, by the base station, a downlink signal of a cell where the base station is located, at a time-frequency position where the base station receiving the inter-station synchronization reference signal of the base station's synchronization source base station.

Combining the first aspect or any one of the first to the tenth possible implementation of the first aspect, in a eleventh possible implementation of the first aspect, where the synchronization reference signal is a synchronization tracking reference signal.

Combining the first aspect or any one of the first to the eleventh possible implementation of the first aspect, in a twelfth possible implementation of the first aspect, where, when a system which the base station belongs to is a long term evolution LTE time division duplex TDD system, the inter-station synchronization reference signal is transmitted in a guard period in a specific subframe; or, when a system which the base station belongs to is an LTE system, the inter-station synchronization reference signal is transmitted in a multi-broadcast single frequency network MBSFN subframe.

A second aspect, provides a base station, including:

a determining module, configured to determine a synchronization status of the base station itself, where the synchronization status includes: a synchronized base station, or, a synchronization source base station; and a configuring module, configured to configure a synchronization reference signal of the base station according to the determined synchronization status of the base station itself, in order that a first time is different from a second time, where the first time is a time when the synchronization reference signal of the base station is transmitted, and the second time is a time when an inter-station synchronization reference signal of the base station's synchronization source base station is transmitted.

Combining the second aspect, in a first possible implementation of the second aspect, where the configuring module, is specifically configured to:

when the base station is a synchronization source base station, configure the synchronization reference signal of the base station to include a user equipment UE downlink synchronization reference signal of the base station and an inter-station synchronization reference signal of the base station, the UE downlink synchronization reference signal of the base station and the inter-station synchronization reference signal of the base station are transmitted at different times, the UE downlink synchronization reference signal of the base station and the inter-station synchronization reference signal of the base station's synchronization source base station are transmitted at different times, and the inter-station synchronization reference signal of the base station and the inter-station synchronization reference signal of the base station's synchronization source base station are transmitted at different times; and when the base station is a synchronized base station, configure the synchronization reference signal of the base station to include a UE downlink synchronization reference signal of the base station, and the UE downlink synchronization reference signal of the base station and the inter-station synchronization reference signal of the base station's synchronization source base station are transmitted at different times;

where the inter-station synchronization reference signal of the base station's synchronization source base station is a synchronization reference signal which is used for inter-station synchronization among synchronization reference signals of the base station's synchronization source base station.

Combining the first possible implementation of the second aspect, in a second possible implementation of the second aspect, where the synchronization reference signals of the base station's synchronization source base station further include a UE downlink synchronization reference signal of the base station's synchronization source base station, and where the configuring module is further configured to:

configure the UE downlink synchronization reference signal of the base station to be transmitted at a same time when the UE downlink synchronization reference signal of the base station's synchronization source base station is transmitted.

Combining the first or the second possible implementation of the second aspect, in a third possible implementation of the second aspect, where all of the following parameters of the UE downlink synchronization reference signal and the inter-station synchronization reference signal are the same, or at least one of the following parameters thereof is different:

sequence generation formula, sequence length, transmitting power, and frequency-domain resource mapping pattern.

Combining the second aspect, in a fourth possible implementation of the second aspect, where the configuring module is specifically configured to:

configure the synchronization reference signal of the base station to be transmitted at a time different from when a synchronization reference signal of the base station's synchronization source base station is transmitted, where the synchronization reference signal is used for UE downlink synchronization and inter-station synchronization.

Combining any one of the first to the fourth possible implementation of the second aspect, in a fifth possible implementation of the second aspect, where the configuring module is further configured to:

when a synchronization level of the base station is different from the synchronization level of another base station, and the difference value is minor than a preset threshold which is bigger than 1, configure the synchronization reference signal of the base station to be transmitted at a time different from when a synchronization reference signal of the other base station is transmitted; or, when a difference value of the synchronization level of the base station and the synchronization level of the other base station is bigger than or equal to a preset threshold which is bigger than 1, configure the synchronization reference signal of the base station to be transmitted at the same time when a synchronization reference signal of the other base station is transmitted; or, when a synchronization level of the base station and the synchronization level of the other base station are the same, configure the synchronization reference signal of the base station to be transmitted at the same time or at a time different from when a synchronization reference signal of the other base station is transmitted.

Combining the fifth possible implementation of the second aspect, in the sixth possible implementation of the second aspect, where when the synchronization reference signal of the base station and the synchronization reference signal of the other base station, which has the same synchronization level with that of the base station, are transmitted at the same time, the configuring module, is further configured to:

configure the synchronization reference signal of the base station to be a sequence which is mutually orthogonal with that of the synchronization reference signal of the other base station; or, configure the synchronization reference signal of the base station to be the same sequence with that of the synchronization reference signal of the other base station.

Combining the second aspect or any one of the first to the fourth possible implementation of the second aspect, in a seventh possible implementation of the second aspect, where, the determining module is specifically configured to:

after the base station receives a notification signaling sent from another base station, determine the base station itself as a synchronization source base station; and when the base station does not receive a notification signaling sent from another base station, determine the base station itself as a synchronized base station;

where the other base station is a base station which takes the present base station as a synchronization source base station.

Combining the seventh possible implementation of the second aspect, in the eighth possible implementation of the second aspect, where, the synchronization status further includes a synchronization level, and the determining module is further configured to:

when the base station is a synchronization source base station, determine the synchronization level of the base station itself according to the synchronization level of the base station's synchronization source base station, where a difference value of the synchronization level of the base station and the synchronization level of the base station's synchronization source base station is 1.

Combining the second aspect or any one of the first to the eighth possible implementation of the second aspect, in a ninth possible implementation of the second aspect, further including:

a updating module, configured to detect periodically a synchronization obtaining reference signal, and reselect the base station's synchronization source base station according to the synchronization obtaining reference signal detected; or, after reselecting the synchronization source base station, transmit a signaling for releasing a synchronization relationship to the previously selected synchronization source base station; or, after being taken as a synchronization source base station and detecting that all synchronization relationships of the base station itself are released, transfer the synchronization status of the base station itself from the synchronization source base station to the synchronized base station; or, after being taken as a synchronized base station and receiving a notification signaling from another base station, transfer the synchronization status of the base station itself from the synchronized base station to the synchronization source base station, where the other base station is a base station which takes the present base station as a synchronization source base station.

Combining the second aspect or any one of the first to the ninth possible implementation of the second aspect, in a tenth possible implementation of the second aspect, where, the configuring module is further configured to:

not transmit a downlink signal of a cell where the base station is located, at a time when the base station receives the inter-station synchronization reference signal of the base station's synchronization source base station; or, not transmit a downlink signal of a cell where the base station is located, at a time-frequency position where the base station receives the inter-station synchronization reference signal of the base station's synchronization source base station.

Combining the second aspect or any one of the first to the tenth possible implementation of the second aspect, in a eleventh possible implementation of the second aspect, where the synchronization reference signal is a synchronization tracking reference signal.

Combining the second aspect or any one of the first to the eleventh possible implementation of the second aspect, in a twelfth possible implementation of the second aspect, where, when a system which the base station belongs to is a long term evolution LTE time division duplex TDD system, the inter-station synchronization reference signal is transmitted in a guard period in a specific subframe; or, when a system which the base station belongs to is an LTE system, the inter-station synchronization reference signal is transmitted in a multi-broadcast single frequency network MBSFN subframe.

A third aspect, provides a base station, including:

a processor, configured to determine a synchronization status of the base station itself, where the synchronization status includes: a synchronized base station, or, a synchronization source base station; and, configure a synchronization reference signal of the base station according to the determined synchronization status of the base station itself, in order that a first time is different from a second time, where the first time is a time when the synchronization reference signal of the base station is transmitted, and the second time is a time when an inter-station synchronization reference signal of the base station's synchronization source base station is transmitted.

Combining the third aspect, in a first possible implementation of the third aspect, where the processor is specifically configured to:

when the base station is a synchronization source base station, configure the synchronization reference signal of the base station to include a user equipment UE downlink synchronization reference signal of the base station and an inter-station synchronization reference signal of the base station, the UE downlink synchronization reference signal of the base station and the inter-station synchronization reference signal of the base station are transmitted at different times, the UE downlink synchronization reference signal of the base station and the inter-station synchronization reference signal of the base station's synchronization source base station are transmitted at different times, and the inter-station synchronization reference signal of the base station and the inter-station synchronization reference signal of the base station's synchronization source base station are transmitted at different times; and when the base station is a synchronized base station, configure the synchronization reference signal of the base station to include a UE downlink synchronization reference signal of the base station, and the UE downlink synchronization reference signal of the base station and an inter-station synchronization reference signal of the base station's synchronization source base station are transmitted at different times;

where the inter-station synchronization reference signal of the base station's synchronization source base station is a synchronization reference signal which is used for inter-station synchronization among synchronization reference signals of the base station's synchronization source base station.

Combining the first possible implementation of the third aspect, in a second possible implementation of the third aspect, where the synchronization reference signals of the base station's synchronization source base station further include a UE downlink synchronization reference signal of the base station's synchronization source base station, and where the processor is further configured to:

configure the UE downlink synchronization reference signal of the base station to be transmitted at a same time when the UE downlink synchronization reference signal of the base station's synchronization source base station is transmitted.

Combining the first or the second possible implementation of the third aspect, in a third possible implementation of the third aspect, where all of the following parameters of the UE downlink synchronization reference signal and the inter-station synchronization reference signal are the same, or at least one of the following parameters thereof is different:

sequence generation formula, sequence length, transmitting power, and frequency-domain resource mapping pattern.

Combining the third aspect, in a fourth possible implementation of the third aspect, where the processor is specifically configured to:

configure the synchronization reference signal of the base station to be transmitted at a time different from when a synchronization reference signal of the base station's synchronization source base station is transmitted, where the synchronization reference signal is used for UE downlink synchronization and inter-station synchronization.

Combining any one of the first to the fourth possible implementation of the third aspect, in a fifth possible implementation of the third aspect, where the processor is further configured to:

when a synchronization level of the base station is different from the synchronization level of another base station, and the difference value is minor than a preset threshold which is bigger than 1, configure the synchronization reference signal of the base station to be transmitted at a time different from when a synchronization reference signal of the other base station is transmitted; or, when a difference value of the synchronization level of the base station and the synchronization level of the other base station is bigger than or equal to a preset threshold which is bigger than 1, configure the synchronization reference signal of the base station to be transmitted at the same time when a synchronization reference signal of the other base station is transmitted; or, when a synchronization level of the base station and the synchronization level of the other base station are the same, configure the synchronization reference signal of the base station to be transmitted at the same time or at a time different from when a synchronization reference signal of the other base station is transmitted.

Combining the fifth possible implementation of the third aspect, in the sixth possible implementation of the third aspect, where when the synchronization reference signal of the base station and the synchronization reference signal of the other base station, which has the same synchronization level with that of the base station, are transmitted at the same time, the processor is further configured to:

configure the synchronization reference signal of the base station to be a sequence which is mutually orthogonal with that of the synchronization reference signal of the other base station; or, configure the synchronization reference signal of the base station to be the same sequence with that of the synchronization reference signal of the other base station.

Combining the third aspect or any one of the first to the fourth possible implementation of the third aspect, in a seventh possible implementation of the third aspect, further including:

a transceiver, configured to receive a notification signaling sent from another base station;

the processor is specifically configured to determine the base station itself as a synchronization source base station when the transceiver receive the notification signaling sent from another base station; or, determine the base station itself as a synchronized base station when the transceiver does not receive a notification signaling from other base station; and where the other base station is a base station which takes the present base station as a synchronization source base station.

Combining the seventh possible implementation of the third aspect, in the eighth possible implementation of the third aspect, where, the synchronization status further includes a synchronization level, and the processor is further configured to:

when the base station is a synchronization source base station, determine the synchronization level of the base station itself according to the synchronization level of the base station's synchronization source base station, where a difference value of the synchronization level of the base station and the synchronization level of the base station's synchronization source base station is 1.

Combining the third aspect or any one of the first to the eighth possible implementation of the third aspect, in a ninth possible implementation of the third aspect, the processor is further configured to:

detect periodically a synchronization obtaining reference signal, and reselect the base station's synchronization source base station according to the synchronization obtaining reference signal detected; or, after reselecting the synchronization source base station, transmit a signaling for releasing a synchronization relationship to the previously selected synchronization source base station; or, after being taken as a synchronization source base station and detecting that all synchronization relationships of the base station itself are released, transfer the synchronization status of the base station itself from the synchronization source base station to the synchronized base station; or, after being taken as a synchronized base station and receiving a notification signaling from another base station, transfer the synchronization status of the base station itself from the synchronized base station to the synchronization source base station, where the other base station is a base station which takes the present base station as a synchronization source base station.

Combining the third aspect or any one of the first to the ninth possible implementation of the third aspect, in a tenth possible implementation of the third aspect, where, the processor is further configured to:

not transmit a downlink signal of a cell where the base station is located, at a time when the base station receives the inter-station synchronization reference signal of the base station's synchronization source base station; or, not transmit a downlink signal of a cell where the base station is located, at a time frequency position where the base station receives the inter-station synchronization reference signal of the base station's synchronization source base station.

Combining the third aspect or any one of the first to the tenth possible implementation of the third aspect, in a eleventh possible implementation of the third aspect, where the synchronization reference signal is a synchronization tracking reference signal.

Combining the third aspect or any one of the first to the eleventh possible implementation of the third aspect, in a twelfth possible implementation of the third aspect, where, when a system which the base station belongs to is a long term evolution LTE time division duplex TDD system, the inter-station synchronization reference signal is transmitted in a guard period in a specific subframe; or, when a system which the base station belongs to is an LTE system, the inter-station synchronization reference signal is transmitted in a multi-broadcast single frequency network MBSFN subframe.

In the present embodiment, the small base station, of which the synchronization reference signal and the inter-station synchronization reference signal of a synchronization source of the small base station are not transmitted at the same subframe, may receive the inter-station synchronization reference signal at a subframe corresponding to the synchronization source and perform inter-station synchronization, and afterwards may transmit the synchronization reference signal at its own subframe for UE downlink synchronization, or further for inter-station synchronization of other small base stations, which may achieve the inter-station synchronization and the UE downlink synchronization in one period, thereby improving the synchronization performance.

BRIEF DESCRIPTION OF DRAWINGS

In order to describe the technical solutions in embodiments of the present invention more clearly, the following briefly introduces the accompanying drawings needed for describing the embodiments. Apparently, the accompanying drawings in the following description illustrate merely some embodiments of the present invention, and persons of ordinary skill in the art may derive other drawings from these accompanying drawings without creative effort.

FIG. 1 is a schematic diagram of synchronization status among small base stations in embodiments of the present invention;

FIG. 2 is a schematic flowchart of a synchronization method according to an embodiment of the present invention;

DESCRIPTION OF EMBODIMENTS

Figure 3:
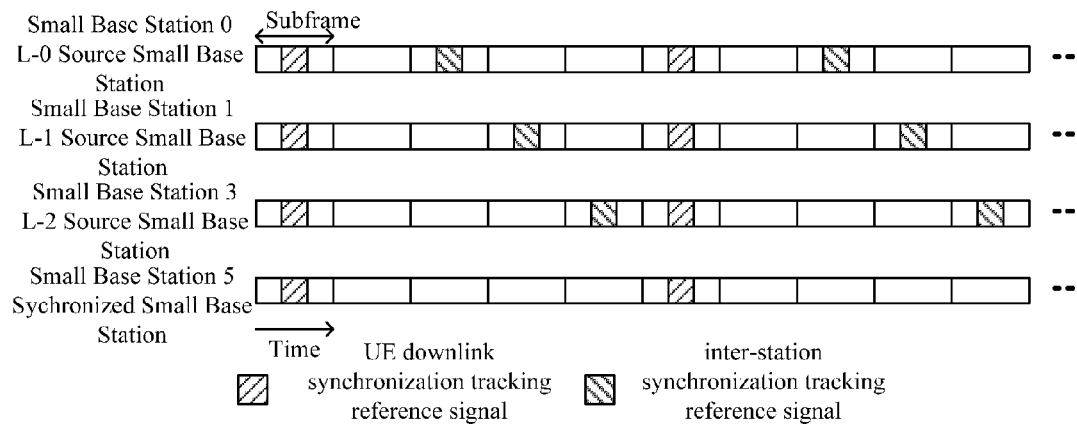
FIG. 3 is a schematic diagram of a synchronous tracking reference signal configured by each small base station according to an embodiment of the present invention.

To make the objectives, technical solutions, and advantages of embodiments of the present invention clearer, the following clearly and comprehensively describes the technical solutions in embodiments of the present invention with reference to the accompanying drawings in embodiments of the present invention. Apparently, the described embodiments are merely a part rather than all embodiments of the present invention. All other embodiments obtained by persons of ordinary skill in the art based on embodiments of the present invention without creative effort shall fall within the protection scope of the present invention.

FIG. 1 is a schematic diagram of synchronization status among small base stations in an embodiment of the present invention, as shown in FIG. 1, a group of small base stations deployed densely need to achieve inter-station synchronization. During the inter-station synchronization, a small base station which is taken as a synchronization source is named as synchronization source small base station, and a small base station which needs to be synchronized through a synchronization source small base station is named as a synchronized small base station, and some small base stations, which need to be synchronized through a synchronization source small base station and then need to be taken as synchronization sources by other small base stations, are also deemed as synchronization source small base stations. The small base stations may be an access point (Access Point, AP), a micro base station (Micro), a pico base station (Pico), an indoor base station (Femto), a low mobility base station (Low Mobility, LoMo), a low power transmission node (Low Power Node, LPN), or a radio remote unit (Radio Remote Unit, RRU), and so on.

To identify synchronization status of each small base station, a synchronization level of a synchronization source small base station may be further defined, where, the synchronization level of a synchronization source small base station which is synchronized though an external synchronization source and provides synchronization to other small base stations in the group to which the small base station belongs is L-0, the synchronization level of a synchronization source small base station, which is inter-station synchronized with a L-0 synchronization source small base station and provides synchronization to other small base stations, is L-1, and by this analogy, the synchronization level of a synchronization source small base station, which is inter-station synchronized with a L-n synchronization source small base station and provides synchronization to other small base stations, is L-(n+1). Where, the external synchronization sources may include: a global position system (Global Position System, GPS), a synchronization source provided in a way of IEEE 1588, or other adjacent macro base stations.

For example, a synchronization relations among the small base stations 0~5 in FIG. 1 are: small base station 0 may be synchronized through an external synchronization source (such as a GPS); small base station 1 and small base station 2 are synchronized through small base station 0; small base station 3 is synchronized through small base station 2; small base station 4 is synchronized through small base station 2; and small base station 5 is synchronized through small base station 3.

Because that small base stations 0~3 provide synchronization to other small base stations, all these small base stations are synchronization source small base stations and each of them have its own synchronization level respectively, for example, the synchronization level of small base station 0 is L-0, that is, small base station 0 is a L-0 synchronization source small base station; the synchronization level of both small base station 1 and small base station 2 is L-1, both of them are L-1 synchronization source small base stations; and the synchronization level of small base station 3 is L-2, as a L-2 synchronization source small base station. While the small base station 4 and small base station 5 do not provide synchronization to other small base stations, and are only synchronized from other small base stations, thus both of them are synchronized small base stations. When a small base station is synchronized through a synchronization source small base station, then the synchronization source small base station is the synchronization source small base station of the small base station.

Besides, except for the aforementioned inter-station synchronization, the small base station also provides downlink synchronization to UEs in a cell where the small base station is located. For example, except for receiving an inter-station synchronization reference signal sent by small base station 0, small base station 1 also need to provides synchronization reference signal for UE downlink synchronization to UEs in the cell where small base station 1 is located.

In prior art, each small base station use a same configuration of synchronization reference signal, and the synchronization reference signal is used for both inter-station synchronization and UE downlink synchronization. For example, it is assumed that a period of a synchronization reference signal is 2 subframes, then both small base station 0 and small base station 1 need to transmit synchronization reference signals over such as the first, third, fifth, . . . subframes, that is, small base station 1 needs to receive the synchronization reference signal transmitted by small base station 0 over a subframe among the first, third, fifth, . . . subframes, and complete inter-station synchronization according to the synchronization reference signal received, afterwards, small base station 1 also needs to transmit synchronization reference signals over a subframe among the first, third, fifth, . . . subframes for UE downlink synchronization. Due to that small base station 1 cannot co-frequency transmit and receive at the same time, it is needed that an interval of at least one period of synchronization reference signal is between the synchronization reference signal received by small base station 1 and the synchronization reference signal sent by small base station 1, for example, small base station 1 receives the synchronization reference signal sent by small base station 0 over the first subframe, due to that small base station 1 cannot co-frequency transmit and receive at the same time, small base station 1 needs to transmit a synchronization reference signal for UE downlink synchronization over the third subframe at the earliest. Therefore, when the period of synchronization reference signal is long, it would need a longer time to achieve both inter-station synchronization and UE downlink synchronization, which would impact the synchronization performance.

Therefore, the following embodiments of the present invention are provided in order to improve the synchronization performance.

FIG. 2 is a schematic flowchart of a synchronization method according to an embodiment of the present invention, includes:

21: A base station determines a synchronization status of the base station itself, the synchronization status includes: a synchronized base station, or, a synchronization source base station;

Where, the base station may specifically be a small base station, such as, AP, Micro, Pico, Femto, LoMo, LPN or RRU and etc. The embodiments of the present invention take the small base station as an example in the subsequent detailed description.

22: The base station configures a synchronization reference signal of the base station, according to the determined synchronization status of the base station itself, in order that a first time is different from a second time, the first time is a time when the synchronization reference signal of the base station is transmitted, and the second time is a time when an inter-station synchronization reference signal of the base station's synchronization source base station is transmitted.

Where, a synchronization reference signal may include a synchronization obtaining reference signal and a synchronization tracking reference signal, the synchronization obtaining reference signal is used for timing synchronization at the time of power on, and the synchronization tracking reference signal is used for periodically synchronization tracking so as to timely correct synchronization deviation. The synchronization obtaining reference signal is such as a primary synchronous signal (Primary Synchronous Signal, PSS) and a secondary synchronous signal (Secondary Synchronous Signal, SSS) in long term evolution (Long Term Evolution, LTE) system in LTE system, and the synchronization tracking reference signal is such as a common reference signal (Common Reference Signal, CRS) in LTE system.

The embodiments of the present invention take that the synchronization reference signal is a synchronization tracking reference signal as an example.

In addition, the aforementioned time may be time domain resource such as a subframe or a symbol and the like, and the embodiments of the present invention take the subframe as an example.

When the small base station is either a synchronization source small base station or a synchronized small base station, the synchronization tracking reference signal sent by the small base station is at least used for downlink synchronization of UEs in the cell where the small base station is located. When the small base station is a synchronization source small base station, the synchronization tracking reference signal is further used for providing inter-station synchronization to the synchronized small base station of the small base station.

The synchronization tracking reference signal used for UE downlink synchronization and the synchronization tracking reference signal for UE inter-station synchronization may be independent synchronization tracking reference signals, herein, may be referred to as a UE downlink synchronization tracking reference signal and an inter-station synchronization tracking reference signal. Or, a same synchronization tracking reference signal may be used for either UE downlink synchronization or inter-station synchronization. The following will describe them respectively.

Mode 1: the synchronization tracking reference signal is distinguished as a UE downlink synchronization tracking reference signal and an inter-station synchronization tracking reference signal.

In this mode, the synchronization tracking reference signal sent by the synchronization source small base station includes the aforementioned two kinds of synchronization tracking reference signals, and the synchronization tracking reference signal sent by the synchronized small base station only includes a UE downlink synchronization tracking reference signal. Herein, a time domain density of the synchronization tracking reference signal configured by the synchronization source small base station is higher than configured time domain density of the synchronization tracking reference signal configured by the synchronized small base station.

In one aspect, regarding the synchronization source small base station: both the UE downlink synchronization tracking reference signal and the inter-station synchronization tracking reference signal are configured, and the UE downlink synchronization tracking reference signal and the inter-station synchronization tracking reference signal are transmitted at different subframes. The two synchronization tracking reference signals may be specifically configured as following:

(1) the UE downlink synchronization tracking reference signal and the inter-station synchronization tracking reference signal have the same configuration, namely, they are configured with the same sequence generation formula, with the same parameters, and with the same frequency-domain resource mapping pattern used in a time domain interval; or, (2) the UE downlink synchronization tracking reference signal and the inter-station synchronization tracking reference signal have different configurations, for example, they are configured with different sequence generation formulas, or, configured with different parameters, or, configured with different frequency-domain resource mapping pattern used in a time domain interval.

The abovementioned parameters configured, for example, includes sequence length, transmitting power and etc.

(3) the time domain density of the UE downlink synchronization tracking reference signal and the time domain density of the inter-station synchronization tracking reference signal may be the same or not.

Since a synchronization source small base station, which has the synchronization level bigger than L-0, needs to obtain timing synchronization from a synchronization source small base station with synchronization level which is one level superior (namely a synchronization source of the synchronization source small base station), and also needs to provides downlink timing synchronization to a UE in the cell where the synchronization source small base station is located, so as to solve the problem that transmitting and receiving are not able to be performed at the same time and over the same frequency, the UE downlink synchronization tracking reference signal of the synchronization source small base station and the inter-station synchronization tracking reference signal of a synchronization source small base station with synchronization level which is one level superior of the synchronization source small base station, need to be transmitted at different subframes. In addition, because the synchronization source small base station further needs to provide timing synchronization to other small base stations, the inter-station synchronization tracking reference signal of the synchronization source small base station and the inter-station synchronization tracking reference signal of a synchronization source small base station with synchronization level which is one level superior of the synchronization source small base station, also need to be transmitted at different subframes.

Specifically, it can be configured: when a difference between synchronization levels of two synchronization source small base stations is smaller than a preset threshold k (k>1), the inter-station synchronization tracking reference signals of the two synchronization source small base stations are transmitted at different subframes; when the difference between synchronization levels of the two synchronization source small base stations is bigger than or equal to k, the inter-station synchronization tracking reference signals of the two synchronization source small base stations are transmitted at different subframes or the same subframe.

For two synchronization source small base stations with the same synchronization level, the synchronization tracking reference signals sent by the two synchronization source small base stations may be transmitted at the same subframe or at different subframes, and when they are transmitted at the same subframe, mutually orthogonal sequences can be used to distinguish different synchronization source small base stations, or a totally equivalent sequence is used to achieve transmission diversity in order to improve the synchronization performance.

In another aspect, regarding a synchronized small base station: only a UE downlink synchronization tracking reference signal is configured.

The time domain density of the UE downlink synchronization tracking reference signal of the synchronized small base station meets a requirement of UE downlink synchronization tracking precision.

The time domain density of the UE downlink synchronization tracking reference signal of the synchronized small base station and the UE downlink synchronization tracking reference signal of the synchronization source small base station may be the same.

Besides, the configuration of the UE downlink synchronization tracking reference signal of the synchronization source small base station and the configuration of the UE downlink synchronization tracking reference signal of the synchronized small base station can use a configuration of the synchronization tracking reference signal in prior art, in order to achieve backward compatibility. For example, the synchronization tracking reference signal in prior art are transmitted over the first, third, fifth, . . . subframes, and then, the UE downlink synchronization tracking reference signal of the synchronization source small base station and the UE downlink synchronization tracking reference signal of the synchronized small base station are also transmitted over the first, third, fifth, . . . subframes.

For example, with reference to FIG. 3, which shows schematic diagrams of synchronization tracking reference signal configured for each small base station. Where, small base station 0, small base station 1 and small base station 3 are all synchronization source small base stations with corresponding synchronization levels, and small base station 5 is a synchronized small base station.

As shown in FIG. 3, a synchronization tracking reference signal sent by the synchronization source small base station, namely small base station 0, small base station 1 and small base station 3, includes a UE downlink synchronization tracking reference signal and an inter-station synchronization tracking reference signal; and the synchronization tracking reference signal sent by the synchronized small base station, namely small base station 5, only includes a UE downlink synchronization tracking reference signal.

Regarding the synchronization source small base station, the UE downlink synchronization tracking reference signal and the inter-station synchronization tracking reference signal transmitted by each synchronization source small base station and the inter-station synchronization tracking reference signal transmitted by the synchronization source small base station with synchronization level which is one level superior, are transmitted at different subframes. For example, the UE downlink synchronization tracking reference signal of small base station 1 and the inter-station synchronization tracking reference signal of small base station 0 are transmitted at different subframes, and the inter-station synchronization tracking reference signal of the small base station 1 and the inter-station synchronization tracking reference signal of small base station 0, are also transmitted at different subframes.

In addition, for two synchronization source small base stations which are non-adjacent, for example, when the preset threshold k=2, the UE downlink synchronization tracking reference signal and/or the inter-station synchronization tracking reference signal of small base station 3 and the inter-station synchronization tracking reference signal of small base station 0, may be transmitted at the same subframe or at different subframes. When they are transmitted at the same subframe, complexity of system design can be reduced.

Further, the embodiments takes compatibility with prior art as an example, that is, the UE downlink synchronization tracking reference signal of each small base station may use the designs in prior art, for example, with reference to FIG. 2, the UE downlink synchronization tracking reference signals of each small base station are transmitted at the same subframe. Herein, it only needs that the inter-station synchronization tracking reference signals of adjacent synchronization source small base stations are transmitted at different subframes.

Mode 2: the synchronization tracking reference signal is used for either UE downlink synchronization or inter-station synchronization.

In this mode, similar to the prior art, the synchronization tracking reference signal will be used for the aforementioned two purpose, and the difference from the prior art is that, in the present embodiment, the synchronization tracking reference signal of a small base station and a synchronization source of the small base station need to be transmitted at different subframes. Herein, the time domain density of the synchronization tracking reference signal configured by the synchronization source small base station is the same with to the time domain density of the synchronization tracking reference signal configured by the synchronized small base station. In addition, to improve performance, the smallest interval between the synchronization reference signal of the small base station and the synchronization reference signal of the synchronization source of the small base station is smaller than a transmitting period of the synchronization reference signal in the prior art.

For synchronization source small base stations with different synchronization levels, a threshold k (k>1) can be set, when a difference of the synchronization levels of the two synchronization source small base station is smaller than k, the synchronization tracking reference signals of the two synchronization source small base stations are transmitted at different subframes; and when the difference of the synchronization levels of the two synchronization source small base station is bigger than or equal to k, the synchronization tracking reference signals of the two synchronization source small base stations are transmitted at different subframes or at the same subframe.

For two synchronization source small base stations with the same synchronization level, synchronization tracking reference signals sent by the two synchronization source small base stations may be transmitted at the same subframe or at different subframes, and when they are transmitted at the same subframe, mutually orthogonal sequences can be used to distinguish different synchronization source small base stations, or a totally equivalent sequence is used to achieve transmission diversity in order to improve the synchronization performance.

Since the synchronization tracking reference signal of the small base station and the synchronization tracking reference signal of the synchronization source small base station with one level superior are transmitted at different subframes, the small base station may transmit a UE downlink synchronization tracking reference signal of its own cell at a time different from when the small base station receives the synchronization tracking reference signal sent by a synchronization source small base station with one level superior, then a UE timing synchronization and an inter-station synchronization are accomplished independently.

Figure 4:
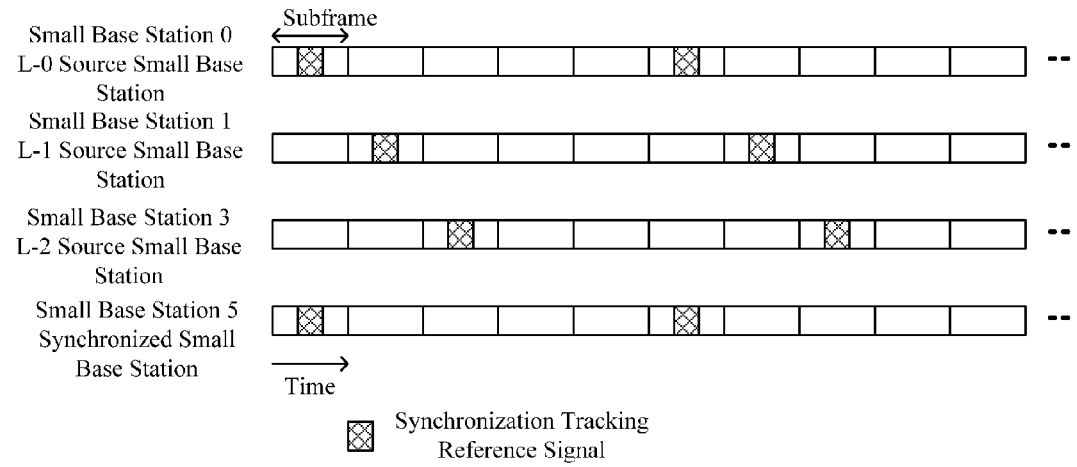
FIG. 4 is a schematic diagram of another synchronous tracking reference signal configured by each small base station according to an embodiment of the present invention.

For example, with reference to FIG. 4, each small base station is configured with the synchronization tracking reference signal, and contents of these synchronization tracking reference signals may be the same, and the synchronization tracking reference signal of each small base station and that of their synchronization source small base stations with one level superior, are transmitted at different frames. For example, the synchronization tracking reference signal of small base station 1 and the synchronization tracking reference signal of small base station 0 are transmitted at different subframes, the synchronization tracking reference signal of small base station 3 and the synchronization tracking reference signal of small base station 1 are transmitted at different subframes, and the synchronization tracking reference signal of small base station 5 and the synchronization tracking reference signal of small base station 3 are transmitted at different subframes.

Besides, for the small base stations with no direct synchronization relationship therebetween, their synchronization tracking reference signals may transmitted at the same subframe, for example, as shown in FIG. 4, the synchronization tracking reference signal of small base station 5 and the synchronization tracking reference signal of small base station 0 are transmitted at the same subframe, in order to reduce the complexity of system design. The synchronization tracking reference signals are distinguished in Mode 1 mentioned above. Herein, the UE downlink synchronization tracking reference signal may use a design in prior art, supporting backward compatibility; and the synchronization tracking reference signals are not distinguished in Mode 2, which may lower reference signal cost.

In addition, the small base station does not transmit the downlink signal in its own cell at a time when the small base station receives the inter-station synchronization reference signal sent by the synchronization source small base station of the small base station; or, the small base station does not transmit the downlink signal in its own cell at a time frequency position where the small base station receives the inter-station synchronization reference signal sent by the synchronization source small base station of the small base station. For example, with reference to FIG. 3, small base station 1 does not transmit the downlink signal in the cell of small base station 1 over a subframe (or time frequency position) where the inter-station synchronization tracking reference signal of small base station 0 is located.

In order to avoid the transmission and reception of the inter-station synchronization reference signal from impacting the normal communication between a small base station and a UE, the inter-station reference signal may be transmitted at a specific time. For example, in the LTE time division duplex (Time Division Duplex, TDD) system, the inter-station reference signal may be transmitted in a guard period (Guard Period, GP) for switching between uplink and downlink which is transmitted at a specific subframe, since in the time slot, there is no signal transmission between a base station and a UE, and the length of the time slot may be configured to ensure there is still a redundant time for transmitting the inter-station synchronization reference signal except for time needed for the system to switch between uplink and downlink. The aforementioned small base stations with different synchronization levels may transmit the inter-station synchronization reference signals in GPs of different specific subframes, or may transmit the inter-station synchronization reference signals at different times in the GP of the same specific subframes. Besides, in LTE system, the inter-station reference signal may be transmitted in a downlink subframe which is configured as multi-broadcast single frequency network (Multi-Broadcast Single Frequency Network, MBSFN), in which there is no data transmission between a base station and a UE, and the aforementioned small base stations with different synchronization levels may transmit the inter-station synchronization reference signals in different MBSFN subframes, or may transmit the inter-station synchronization reference signals at different times in the same MBSFN subframe. Herein, the subframe position for transmitting the inter-station synchronization reference signal in LTE system is set, and the configuration method for the small base stations to transmit the inter-station synchronization reference signals at these subframes is as previously described.

In the present embodiment, the small base station, of which the synchronization reference signal and the inter-station synchronization reference signal of a synchronization source of the small base station are not transmitted at the same subframe, may receive the inter-station synchronization reference signal at a subframe corresponding to the synchronization source and perform inter-station synchronization, and afterwards may transmit the synchronization reference signal at its own subframe for UE downlink synchronization, or further for inter-station synchronization of other small base stations, which may achieve the inter-station synchronization and the UE downlink synchronization in one period, thereby improving the synchronization performance.

Figure 5:
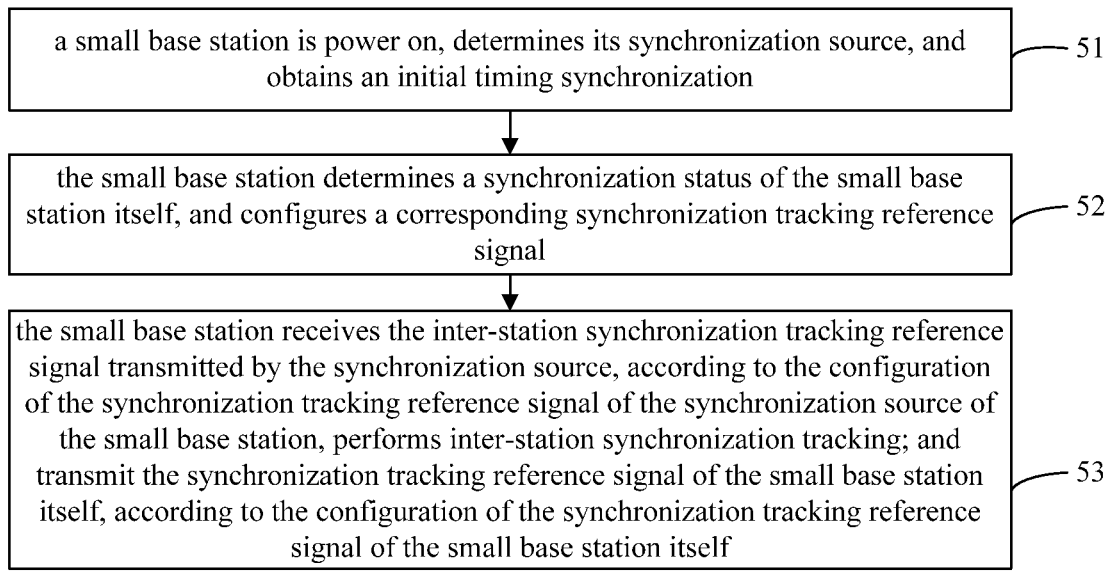
FIG. 5 is a schematic flowchart of the synchronization method according to another embodiment of the present invention.

FIG. 5 is a schematic flowchart of a synchronization method according to another embodiment of the present invention, includes:

51: a small base station is powered on, determining its synchronization source, and obtaining an initial timing synchronization.

When the small base station has the function of external synchronization obtaining such as from a GPS, or a macro base station and the like, then the small base station obtains the initial timing synchronization from the external synchronization sources.

When the small base station does not have the function of external synchronization obtaining, then the small base station receives an synchronization obtaining reference signal transmitted by adjacent small base stations, identifies the synchronization obtaining reference signal with strongest reception power by relevant detection, obtains the initial timing synchronization according to the synchronization obtaining reference signal with strongest reception power, determines the small base station which transmits the synchronization obtaining reference signal and takes it as the synchronization source. In addition, the small base station which obtains the initial timing synchronization, may transmit a notification signaling to the synchronization source's small base station, and the notification signaling is used for notifying that the small base station has already obtained timing synchronization though the synchronization source's small base station.

52: the small base station determines a synchronization status of the small base station itself, and configures a corresponding synchronization tracking reference signal.

If the small base station receives the notification signaling transmitted by other small base stations, the small base station determines itself as a synchronization source small base station, and determines a synchronization level of the small base station itself as follows:

When the small base station obtains the initial timing synchronization from an external synchronization source, the small base station may determine the synchronization level of the small base station itself as L-0; and When the small base station obtains the initial timing synchronization from other small base station, the small base station may first acquire the synchronization level of an synchronization source small base station which is one level superior, and then take the synchronization level of the synchronization source small base station which is one level superior plus 1 as the synchronization level of the small base station itself. For example, the small base station obtains the initial timing synchronization from an L-0 synchronization source small base station, and then the synchronization level of the small base station is L-1.

If the small base station does not receive a notification signaling from other small base stations, then determines itself as a synchronized small base station.

After determining the synchronization status of the small base station itself, it can configure the synchronization tracking reference signal in a way according to FIG. 3 or FIG. 4.

For example, while the synchronization tracking reference signal includes a UE downlink synchronization tracking reference signal and an inter-station synchronization tracking reference signal, the small base station may perform configuration of the small base station itself, according to the configuration of the synchronization source small base station which is one level superior, i.e. its synchronization source, and configure the synchronization tracking reference signal of the small base station itself so that the synchronization tracking reference signal of the small base station itself and the inter-station synchronization tracking reference signal of its synchronization source are transmitted at different subframes. When the small base station is a synchronization source small base station, the synchronization tracking reference signal of the small base station itself includes the UE synchronization tracking reference signal of the small base station itself and the inter-station synchronization tracking reference signal of the small base station itself; when the small base station is a synchronized small base station, the synchronization tracking reference signal of the small base station itself includes the UE synchronization tracking reference signal of the small base station itself.

For another example, while the synchronization tracking reference signal is used for either UE downlink synchronization or inter-station synchronization, the synchronization tracking reference signal of the small base station is configured such that the synchronization tracking reference signal of the small base station and the synchronization tracking reference signal of its synchronization source are transmitted at different subframes.

In addition, a synchronization source small base station which is one level superior, may notify the synchronization level of the synchronization source small base station which is one level superior to the small base station through a first signaling, in order that the small base station determines the synchronization level of the small base station itself; and the synchronization source small base station which is one level superior may further notify the configuration of the synchronization tracking signal of the synchronization source small base station which is one level superior to the small base station through a second signaling, in order that the small base station completes its own configuration. Where, the first signaling and the second signaling may be two signalings, and also may be the same signaling. Or, a correspondence between the synchronization level and the configuration of the synchronization tracking reference signal may be preconfigured, herein, the synchronization source small base station which is one level superior also may not transmit the configuration of the synchronization tracking reference signal to the small base station, however the small base station determines the configuration of the synchronization tracking reference signal of the small base station itself according to an implicit correspondence between the synchronization level and the synchronization tracking reference signal.

53: the small base station receives the inter-station synchronization tracking reference signal transmitted by the synchronization source, according to the configuration of the synchronization tracking reference signal of the synchronization source of the small base station, performs inter-station synchronization tracking; and transmit the synchronization tracking reference signal of the small base station itself, according to the configuration of the synchronization tracking reference signal of the small base station itself.

Where, when the small base station is a synchronized small base station, the synchronization tracking reference signal of the small base station itself includes: the UE downlink synchronization tracking reference signal of the small base station, which is used for the UE downlink synchronization tracking of the present cell. Or, When the small base station is a synchronization source small base station, synchronization tracking reference signal of the small base station itself includes: the UE downlink synchronization tracking reference signal of the small base station, which is used for the UE downlink synchronization tracking of the present cell; and, the inter-station synchronization tracking reference signal of the small base station, which is used for inter-station synchronization of other small base stations.

Optionally, the synchronization status of the small base station may be updated, and then, steps 52~53 may be executed repeatedly.

For example, it may update under the situations such as that there is new small base station joined, or the small base station is power off or power on, and the update may includes at least one of the following:

Synchronization source reselection: the small base station may periodically detect the synchronization obtaining reference signal transmitted by the adjacent small base stations, and if a synchronization source with better signal quality than the current synchronization source is detected, then switch its synchronization source to the new small base station. If the small base station itself is also a synchronization source small base station of other small base station, then, the small base station may further update the synchronization level of the small base station itself according to the synchronization level of the new synchronization source, and transmit a signaling to notify the small base stations, which obtains synchronization through the present small base station, to update their synchronization level.

Synchronization relationship release: when the small base station performs reselection of the synchronization source or enters a silent state and does not provide service to users, the small base station may transmit a signaling to its original synchronization source, in order to release the synchronization relationship with the original synchronization source.

Status transferring between the synchronization source small base station and the synchronized small base station: when the small base station which is taken as a synchronization source small base station finds that all small base stations, which obtain synchronization through it, it performs synchronization relationship release with it, then transfers its status of synchronization source small base station to the status of synchronized small base station; when the small base station which is taken as a synchronized small base station, it receives a notification signaling transmitted by other small base stations that their synchronization are obtained though it, then transfers its status of synchronized small base station to the status of synchronization source small base station. After changing of the synchronization status of the small base station, the configuration of its synchronization tracking reference signal changes correspondingly.

The above mentioned signaling communication between the small base station and its synchronization source, may specifically though the following manners: X2 interface between base stations, air interface between base stations, or, forwarding of an upper layer centralized controller.

In addition, the small base station which provides synchronization and the small base station which obtains synchronization may belong to the same operator or different operators.

The present embodiments performs different configurations to the small base station and the synchronization source of the small base station, which may avoid waiting a long time to complete synchronization, ensure the synchronization performance of UE downlink synchronization and inter-station synchronization among small base stations; for two small base stations whose synchronization levels have a big difference, their synchronization reference signals may be configured to use the same subframe, thereby saving resource cost, reducing network power consuming; by distinguishing the downlink synchronization tracking reference signal and the inter-station synchronization tracking reference signal, and keeping the UE downlink synchronization tracking reference signal unchanged, compatibility with the system in the prior art can be achieved; by using tracking reference signals over different subframes for UE downlink synchronization and inter-station synchronization, resource cost can be reduced.

Figure 6:
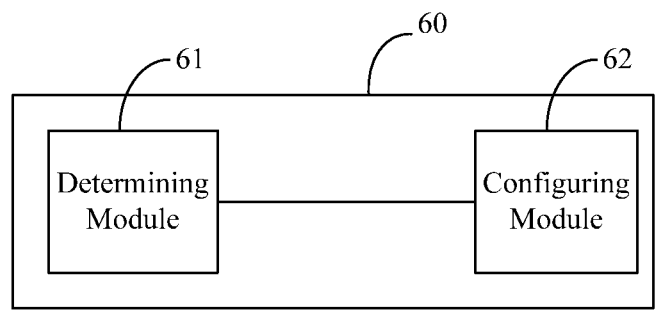
FIG. 6 is a schematic structural diagram of a base station according to an embodiment of the present invention.

FIG. 6 is a schematic structural diagram of a base station according to an embodiment of the present invention, the base station may be a small base station, and the base station 60 includes a determining module 61 and a configuring module 62; the determining module 61 is configured to determine a synchronization status of the base station itself, where the synchronization status includes: a synchronized base station, or, a synchronization source base station; and the configuring module 62 is configured to configure a synchronization reference signal of the base station according to the determined synchronization status of the base station itself, in order that a first time is different from a second time, the first time is a time when the synchronization reference signal of the base station is transmitted, and the second time is a time when an inter-station synchronization reference signal of the base station's synchronization source base station is transmitted.

Optionally, the configuring module is specifically configured to:

when the base station is a synchronization source base station, configure the synchronization reference signal of the base station to include a UE downlink synchronization reference signal of the base station and an inter-station synchronization of the base station which are transmitted at different times, and the UE downlink synchronization reference signal of the base station and the inter-station synchronization reference signal of the base station's synchronization source base station are transmitted at different times, and the inter-station synchronization reference signal of the base station and the inter-station synchronization reference signal of the base station's synchronization source base station are transmitted at different times; and when the base station is a synchronized base station, configure the synchronization reference signal of the base station to include a UE downlink synchronization reference signal of the base station, and the UE downlink synchronization reference signal of the base station and the inter-station synchronization reference signal of the base station's synchronization source base station are transmitted at different times;

the inter-station synchronization reference signal of the base station's synchronization source base station is a synchronization reference signal used for inter-station synchronization among synchronization reference signals of the base station's synchronization source base station.

Optionally, the synchronization reference signals of the base station's synchronization source base station further includes a UE downlink synchronization reference signal of the base station's synchronization source base station, and the configuring module is further configured to:

configure the UE downlink synchronization reference signal of the base station and the UE downlink synchronization reference signal of the base station's synchronization source base station so that they are transmitted at the same time.

Optionally, all of the following parameters of the downlink synchronization reference signal of the UE and the inter-station synchronization reference signal are the same or at least one of the following parameters thereof is different:

sequence generation formula, sequence length, transmitting power, and frequency-domain resource mapping pattern.

Optionally, the configuring module is specifically configured to:

configure the synchronization reference signal of the base station to be transmitted at a time different from when a synchronization reference signal of the base station's synchronization source base station is transmitted, the synchronization reference signal is used for UE downlink synchronization and inter-station synchronization.

Optionally, the configuring module is further configured to:

when a synchronization level of the base station is different from the synchronization level of another base station, and the difference value is minor than a preset threshold which is bigger than 1, configure the synchronization reference signal of the base station to be transmitted at a time different from when a synchronization reference signal of the other base station is transmitted; or, when a difference of the synchronization level of the base station and the synchronization level of another base station is bigger than or equal to a preset threshold which is bigger than 1, configure the synchronization reference signal of the base station to be transmitted at the same time when a synchronization reference signal of the other base station is transmitted; or, when a synchronization level of the base station and the synchronization level of another base station are the same, configure the synchronization reference signal of the base station to be transmitted at the same time or at a time different from when a synchronization reference signal of the other base station is transmitted.

Optionally, when the synchronization reference signal of the base station and the synchronization reference signal of the other base station, which has the same synchronization level with that of the base station, are transmitted at the same time, the configuring module is further configured to:

configure the synchronization reference signal of the base station to be a sequence which is mutually orthogonal with that of the synchronization reference signal of the other base station; or, configure the synchronization reference signal of the base station to be the same sequence with that of the synchronization reference signal of the other base station.

Optionally, the determining module is specifically configured to:

after the base station receives a notification signaling sent from other base stations, determine the base station itself as a synchronization source base station; and when the base station does not receive a notification signaling sent from other base stations, determine the base station itself as a synchronized base station;

the other base stations are base stations which take the present base station as a synchronization source base station.

Optionally, the synchronization status further includes a synchronization level, and the determining module is further configured to:

when the base station is a synchronization source base station, determine the synchronization level of the base station itself, according to the synchronization level of the base station's synchronization source base station, where a difference of the synchronization level of the base station and the synchronization level of the base station's synchronization source base station is 1.

Optionally, the base station further includes:

an updating module, configured to detect periodically a synchronization obtaining reference signal, and reselect the base station's synchronization source base station according to the synchronization obtaining reference signal detected; or, after reselecting the base station's synchronization source base station, transmit a signaling for releasing a synchronization relationship to the previously selected synchronization source base station; or, after being taken as a synchronization source base station and detecting that all synchronization relationships of the base station itself are released, transfer the synchronization status of the base station itself from the synchronization source base station to the synchronized base station; or, after being taken as a synchronized base station and receiving a notification signaling from other base stations, transfer the synchronization status of the base station itself from the synchronized base station to the synchronization source base station, the other base stations are base stations which take the present base station as a synchronization source base station.

Optionally, the configuring module is further configured to:

not transmit a downlink signal of a cell where the base station is located, at a time when the base station receives the inter-station synchronization reference signal from the base station's synchronization source base station; or, not transmit a downlink signal of a cell where the base station is located, at a time-frequency position where the base station receives the inter-station synchronization reference signal from the base station's synchronization source base station.

Optionally, the synchronization reference signal is a synchronization tracking reference signal.

Optionally, when a system which the base station belongs to is an LTE TDD system, the inter-station synchronization reference signal is transmitted in a guard period in a specific subframe; or, when a system which the base station belongs to is an LTE system, the inter-station synchronization reference signal is transmitted in a MBSFN subframe.

In the present embodiment, the synchronization reference signal of the base station and the inter-station synchronization reference signal of the base station's synchronization source base station are not transmitted at the same subframe, the base station may receive the inter-station synchronization reference signal at a time corresponding to the synchronization source base station and perform inter-station synchronization, and afterwards may transmit the synchronization reference signal at its own time for UE downlink synchronization, or further for inter-station synchronization to other base stations, thereby achieving the inter-station synchronization and the UE downlink synchronization in one period and improving the synchronization performance.

Figure 7:
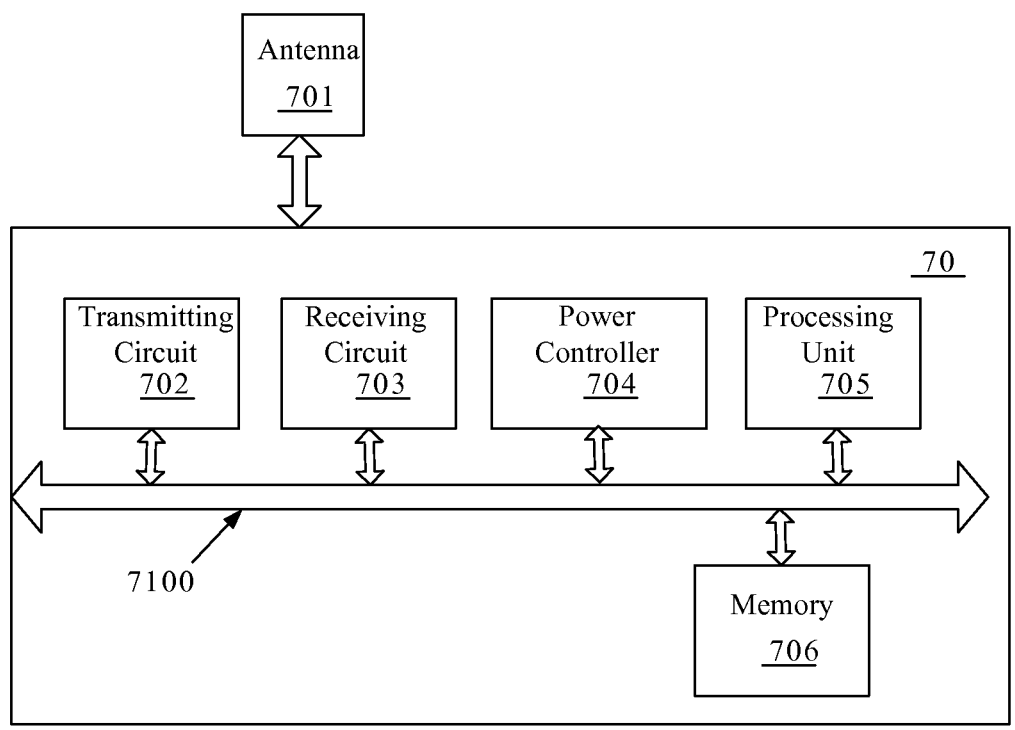
FIG. 7 is a schematic structural diagram of a base station according to another embodiment of the present invention.

FIG. 7 is a schematic structural diagram of a base station according to another embodiment of the present invention, the base station may be a small base station, the base station 70 includes a transmitting circuit 702, a receiving circuit 703, a power controller 704, a processor 705, a memory 706 and an antenna 701. The processor 705 controls the device 70's operations, and the processor 705 may also be referred to as a CPU. The memory 706 may includes a read-only memory and a random access memory, and provides instructions or data to the processor 705. Part of the memory 706 may also includes a non-volatile random access memory (Non-Volatile Random Access Memory, NVRAM). In specific application, the base station 70 may be embedded into a small base station or itself may be a small base station, it may also contain carriers for accommodating the transmitting circuit 702 and the receiving circuit 703, in order to allow data transmitting and receiving between the base station 70 and a remote device. However, it is also possible that the base station 70 is a simplified schematic diagram of a network or wireless device. The transmitting circuit 702 and the receiving circuit 703 may be coupled to the antenna 701. All components of the base station 70 are coupled together through a bus system 7100. Except for a data bus, the bus system 7100 further includes a power bus, a control bus and a status signal bus. But for clarity, different kinds of bus in the Figures are all labeled as the bus system 7100. The base station 70 may further include the power controller 704.

The aforementioned methods disclosed by the embodiments of the present invention may be applied in the processor 705, or, in other words, achieved by the processor 705. The processor 705 may be a kind of integrated circuit chip capable of signal processing. In implementation process, each step of the above methods may be completed via a hardware integrated logic circuit in the processor 705 or instructions in form of software. For executing the methods disclosed in the embodiments of the present invention, the above mentioned processor may be a universal processor, a digital signal processor (Digital Signal Processor, DSP), an application specific integrated circuit (Application Specific Integrated Circuit, ASIC), a field programmable gate array (Field Programmable Gate Array, FPGA) or other programmable logic devices, a discrete gate or a transistor logic device, discrete hardware components, which may complete or execute the methods, steps or logic block diagrams disclosed in the embodiments of the present invention. The universal processor may be a micro processor or the processor may also be any kind of conventional processor, a decoder and so on. The steps in the methods disclosed by the embodiments of the present invention may be directly reflected as executed and completed by a hardware decoding processor, or executed and completed by a combination of a hardware and a software module in the decoding processor. The software module may be located in a random access memory, a flash, a read-only memory, a programmable read-only memory, or an electrical erasable programmable memory, a register and the like which are sophisticated storage medium in the art. The storage medium is located in the memory 706, and the processor 705 reads information from the memory 706, to complete the steps in the above mentioned methods by incorporating with its hardware.

Specifically, the base station may include: a processor, configured to determine a synchronization status of the base station itself, the synchronization status includes: a synchronized base station, or, a synchronization source base station; and, configure a synchronization reference signal of the base station according to the determined synchronization status of the base station itself, in order that a first time is different from a second time, the first time is a time when the synchronization reference signal of the base station is transmitted, and the second time is a time when an inter-station synchronization reference signal of the base station's synchronization source base station is transmitted.

Optionally, the processor is specifically configured to:

when the base station is a synchronization source base station, configure the synchronization reference signal of the base station to include a UE downlink synchronization reference signal of the base station and an inter-station synchronization reference signal of the base station which are transmitted at different times, and the UE downlink synchronization reference signal of the base station and the inter-station synchronization reference signal of the base station's synchronization source base station are transmitted at different times, and the inter-station synchronization reference signal of the base station and the inter-station synchronization reference signal of the base station's synchronization source base station are transmitted at different times; and when the base station is a synchronized base station, configure the synchronization reference signal of the base station to include a UE downlink synchronization reference signal of the base station, and the UE downlink synchronization reference signal of the base station and the inter-station synchronization reference signal of the base station's synchronization source base station are transmitted at different times;

the inter-station synchronization reference signal of the base station's synchronization source base station is a synchronization reference signal used for inter-station synchronization among synchronization reference signals of the base station's synchronization source base station.

Optionally, the synchronization reference signals of the base station's synchronization source base station further includes a UE downlink synchronization reference signal of the base station's synchronization source base station, and where the processor is further configured to:

configure the UE downlink synchronization reference signal of the base station and the UE downlink synchronization reference signal of the base station's synchronization source base station are transmitted at the same time.

Optionally, all of the following parameters of the downlink synchronization reference signal of the UE and the inter-station synchronization reference signal are the same or at least one of the following parameters thereof is different:

sequence generation formula, sequence length, transmitting power, and frequency-domain resource mapping pattern.

Optionally, the processor is specifically configured to:

configure the synchronization reference signal of the base station to be transmitted at a time different from when a synchronization reference signal of the base station's synchronization source base station is transmitted, the synchronization reference signal is used for UE downlink synchronization and inter-station synchronization.

Optionally, the processor is further configured to:

when a synchronization level of the base station is different from the synchronization level of another base station, and the difference value is minor than a preset threshold which is bigger than 1, configure the synchronization reference signal of the base station to be transmitted at a time different from when a synchronization reference signal of the other base station is transmitted; or, when a difference of the synchronization level of the base station and the synchronization level of another base station is bigger than or equal to a preset threshold which is bigger than 1, configure the synchronization reference signal of the base station to be transmitted at the same time when a synchronization reference signal of the other base station is transmitted; or, when a synchronization level of the base station and the synchronization level of another base station are the same, configure the synchronization reference signal of the base station to be transmitted at the same time or at a time different from when a synchronization reference signal of the other base station is transmitted.

Optionally, when the synchronization reference signal of the base station and the synchronization reference signal of the other base station, which has the same synchronization level with that of the base station, are transmitted at the same time, the processor is further configured to:

configure the synchronization reference signal of the base station to be a sequence which is mutually orthogonal with that of the synchronization reference signal of the other base station; or, configure the synchronization reference signal of the base station to be the same sequence with that of the synchronization reference signal of the other base station.

Optionally, the base station further includes:

a transceiver, configured to receive a notification signaling sent from another base station;

the processor is specifically configured to determine the base station itself as a synchronization source base station when the transceiver receive the notification signaling sent from other base stations; or, determine the base station itself as a synchronized base station when the transceiver does not receive a notification signaling sent from other base stations; and the other base stations are base stations which take the present base station as a synchronization source base station.

Optionally, the synchronization status further includes a synchronization level, and the processor is further configured to:

when the base station is a synchronization source base station, determine the synchronization level of the base station itself, according to the synchronization level of the base station's synchronization source base station, where a difference of the synchronization level of the base station and the synchronization level of the base station's synchronization source base station is 1.

Optionally, the processor is further configured to:

detect periodically a synchronization obtaining reference signal, and reselect the base station's synchronization source base station according to the synchronization obtaining reference signal detected; or, after reselecting the base station's synchronization source base station, transmit a signaling for releasing a synchronization relationship to the previously selected synchronization source base station; or, after being taken as a synchronization source base station and detecting that all synchronization relationships of the base station itself are released, transfer the synchronization status of the base station itself from the synchronization source base station to the synchronized base station; or, after being taken as a synchronized base station and receiving a notification signaling from other base stations, transfer the synchronization status of the base station itself from the synchronized base station to the synchronization source base station, the other base stations are base stations which take the present base station as a synchronization source base station.

Optionally, the processor is further configured to:

not transmit a downlink signal of a cell where the base station is located, at a time when the base station receives the inter-station synchronization reference signal from the base station's synchronization source base station; or, not transmit a downlink signal of a cell where the base station is located, at a time-frequency position where the base station receives the inter-station synchronization reference signal from the base station's synchronization source base station.

Optionally, the synchronization reference signal is a synchronization tracking reference signal.

Optionally, when a system which the base station belongs to is an LTE TDD system, the inter-station synchronization reference signal is transmitted in a guard period in a specific subframe; or, when a system which the base station belongs to is an LTE system, the inter-station synchronization reference signal is transmitted in a MBSFN subframe.

In the present embodiment, the synchronization reference signal of the base station and the inter-station synchronization reference signal of the base station's synchronization source base station are not transmitted at the same subframe, the base station may receive the inter-station synchronization reference signal at a time corresponding to the synchronization source base station and perform inter-station synchronization, and afterwards may transmit the synchronization reference signal at its own time for UE downlink synchronization, or further for inter-station synchronization to other base stations, thereby achieving the inter-station synchronization and the UE downlink synchronization in one period and improving the synchronization performance.

Skilled persons in the art may clearly understand that, for convenience and clarity, it is illustrated only according to a division of the above mentioned functional modules, in practical application, the above functions may be distributed to and accomplished by different functional modules, that is, dividing an interior structure of an apparatus to different functional modules, to complete part of or all of the above mentioned functions. A specific work process of the above described system, apparatus, and unit, may be referred to the corresponding process in the aforementioned method embodiments, which will not be repeated hereby.

In the several embodiments provided by the present application, it should be understood that, the system, apparatus, and method disclosed, may be implemented through other manners. For example, the above described apparatus embodiments are merely schematic, e.g., the division of modules or units, is merely a division according to logic functions, and in actual implementation, there may be other ways of division, for example, multiple units or components may be combined or may be integrated into another system, or some features may be ignored or may not be executed. In another point, mutual coupling, direct coupling or communication connection as shown or as discussed, may be indirect coupling or communication connection through some interfaces, apparatus or units, which may be electrical, mechanical or in other forms.

A unit described as a separate component may be or may not be separated physically, a component as a unit shown may be or may not be a physical unit, namely, may be located in one place, or distributed on multiple network units. Part of or all of the units may be selected to achieve an objective of solutions in the present embodiments, according to actual needs.

In addition, each functional unit in embodiments of the present application may be integrated into one processing unit, or it may also be that each unit exists independently and physically, or it may also be that two or more units are integrated into one unit. The above mentioned integrated unit may be either implemented in form of hardware, or implemented in form of software functional unit.

While the integrated unit, which is implemented in form of software functional unit, is taken as an independent product for use or sale, and may be stored in a computer readable storage medium. Based on such understanding, the technical solution in the present invention substantially, or the part contributed to the prior art, or part of or entire of the technical solution may be reflected in form of a software product, and the software product is stored in a storage medium, including several instructions in order to enable a computer device (which may be a personal computer, a server, or a network device and the like) or a processor to execute part of or all of the steps of the methods in each embodiment of the present application. And the aforementioned storage medium may include: a U disk, a mobile disk, a read-only memory (ROM, Read-Only Memory), a random access memory (RAM, Random Access Memory), a disk or an optical disk and other kinds of medium which can store program codes.

The above mentioned, the foregoing embodiments are merely intended for describing the technical solutions of the present invention rather than limiting the present invention; although the present invention is described in detail with reference to the foregoing embodiments, persons of ordinary skill in the art should understand that they may still make modifications to the technical solutions described in the foregoing embodiments or make equivalent substitutions to some technical features thereof, without departing from the spirit and scope of the technical solutions of embodiments of the present invention.

What is claimed is:

1. A synchronization method, comprising:
   determining, by a base station, a synchronization status of the base station itself, wherein the synchronization status comprises one of: a synchronization source base station; which acts as a synchronization source during an inter-station synchronization; or a synchronized base station which does not act as a synchronization source and needs to be synchronized through a synchronization source base station during an inter-station synchronization; and
   configuring, by the base station, a synchronization reference signal of the base station according to the determined synchronization status of the base station itself, the synchronization reference signal including a first synchronization tracking signal indicating a first time when the synchronization reference signal of the base station is transmitted, and a second synchronization tracking signal indicating a second time when an inter-station synchronization reference signal of the base station's synchronization source base station is received by the base station, wherein the first time is different from the second time.

2. The method according to claim 1, wherein the configuring the synchronization reference signal of the base station comprises:
   when the base station is the synchronization source base station, configuring the synchronization reference signal of the base station to comprise a user equipment UE downlink synchronization reference signal of the base station and an inter-station synchronization reference signal of the base station, wherein the UE downlink synchronization reference signal of the base station and the inter-station synchronization reference signal of the base station are transmitted at different times, the UE downlink synchronization reference signal of the base station and the inter-station synchronization reference signal of the base station's synchronization source base station are transmitted at different times, and the inter-station synchronization reference signal of the base station and the inter-station synchronization reference signal of the base station's synchronization source base station are transmitted at different times; and
   when the base station is a synchronized base station, configuring the synchronization reference signal of the base station to comprise the UE downlink synchronization reference signal of the base station, and wherein the UE downlink synchronization reference signal of the base station and the inter-station synchronization reference signal of the base station's synchronization source base station are transmitted at different times;
   wherein the inter-station synchronization reference signal of the base station's synchronization source base station is a synchronization reference signal which is used for inter-station synchronization among synchronization reference signals of the base station's synchronization source base station.

3. The method according to claim 2, wherein all of the following parameters of the UE downlink synchronization reference signal and the inter-station synchronization reference signal are the same, or at least one of the following parameters thereof is different:
   sequence generation formula, sequence length, transmitting power, and frequency-domain resource mapping pattern.

4. The method according to claim 1, wherein the configuring the synchronization reference signal of the base station comprises:
   configuring the synchronization reference signals of the base station to be transmitted at a time different from when the synchronization reference signal of the base station's synchronization source base station is transmitted, wherein the synchronization reference signals of the base station are used for UE downlink synchronization and the synchronization reference signal of the bases station's synchronization source base station are used for inter-station synchronization.

5. The method according to claim 2, wherein the synchronization status further comprises a synchronization level, and the configuring the synchronization reference signal of the base station further comprises:
   when the synchronization level of the base station is different from the synchronization level of another base station, and the difference value is minor than a preset threshold which is greater than 1, configuring the synchronization reference signal of the base station to be transmitted at a time different from when a synchronization reference signal of the other base station is transmitted; or,
   when the difference value of the synchronization level of the base station and the synchronization level of another base station is greater than or equal to the preset threshold which is bigger than 1, configuring the synchronization reference signal of the base station to be transmitted at the same time when a synchronization reference signal of the other base station is transmitted; or,
   when the synchronization level of the base station and the synchronization level of another base station are the same, configuring the synchronization reference signal of the base station to be transmitted at the same time or at a time different from when the synchronization reference signal of the other base station is transmitted.

6. The method according to claim 1, wherein the determining, by a base station, a synchronization status of the base station itself, comprises:
   after the base station receiving a notification signaling sent from another base station, determining the base station itself as the synchronization source base station; and
   when the base station does not receive a notification signaling sent from another base station, determining the base station itself as the synchronized base station;
   wherein the other base station is a base station which takes the present base station as the synchronization source base station.

7. The method according to claim 6, wherein the synchronization status further comprises a synchronization level, and the determining, by a base station, a synchronization status of the base station itself, further comprises:

when the base station is the synchronization source base station, determining the synchronization level of the base station itself according to the synchronization level of the base station's synchronization source base station, wherein a difference value between the synchronization level of the base station and the synchronization level of the base station's synchronization source base station is 1.

8. The method according to claim 1, further comprising:

detecting periodically, by the base station, a synchronization obtaining reference signal, and reselecting the base station's synchronization source base station according to the synchronization obtaining reference signal detected; or, after reselecting the synchronization source base station, transmitting, by the base station, a signaling for releasing a synchronization relationship to the previously selected synchronization source base station; or, after being taken as the synchronization source base station and detecting that all synchronization relationships of the base station itself are released, transferring, by the base station, the synchronization status of the base station itself from the synchronization source base station to the synchronized base station; or, after being taken as the synchronized base station and receiving a notification signaling from another base station, transferring, by the base station, the synchronization status of the base station itself from the synchronized base station to the synchronization source base station, wherein the other base station is a base station which takes the present base station as the synchronization source base station.

9. The method according to claim 1, wherein, when a system which the base station belongs to is a long term evolution LTE time division duplex TDD system, the inter-station synchronization reference signal is transmitted in a guard period in a specific subframe; or, when a system which the base station belongs to is an LTE system, the inter-station synchronization reference signal is transmitted in a multi-broadcast single frequency network MBSFN subframe.

10. A base station, comprising:

a processor, configured to determine a synchronization status of the base station itself, wherein the synchronization status comprises one of: a synchronization source base station which acts as a synchronization source during an inter-station synchronization; or a synchronized base station which does not act as a synchronization source and needs to be synchronized through a synchronization source base station during an inter-station synchronization; and, configure a synchronization reference signal of the base station according to the determined synchronization status of the base station itself, the synchronization reference signal including a first synchronization tracking signal indicating a first time when the synchronization reference signal of the base station is transmitted, and a second synchronization tracking signal indicating a second time when an inter-station synchronization reference signal of the base station's synchronization source base station is received by the base station, wherein the first time is different from the second time.

11. The base station according to claim 10, wherein the processor is specifically configured to:

when the base station is the synchronization source base station, configure the synchronization reference signal of the base station to comprise a user equipment UE downlink synchronization reference signal of the base station and an inter-station synchronization reference signal of the base station, wherein the UE downlink synchronization reference signal of the base station and the inter-station synchronization reference signal of the base station are transmitted at different times, the UE downlink synchronization reference signal of the base station and the inter-station synchronization reference signal of the base station's synchronization source base station are transmitted at different times, and the inter-station synchronization reference signal of the base station and the inter-station synchronization reference signal of the base station's synchronization source base station are transmitted at different times; and when the base station is the synchronized base station, configure the synchronization reference signal of the base station to comprise the UE downlink synchronization reference signal of the base station, and wherein the UE downlink synchronization reference signal of the base station and the inter-station synchronization reference signal of the base station's synchronization source base station are transmitted at different times;

wherein the inter-station synchronization reference signal of the base station's synchronization source base station is a synchronization reference signal which is used for inter-station synchronization among synchronization reference signals of the base station's synchronization source base station.

12. The base station according to claim 11, wherein all of the following parameters of the UE downlink synchronization reference signal and the inter-station synchronization reference signal are the same, or at least one of the following parameters thereof is different:

sequence generation formula, sequence length, transmitting power, and frequency-domain resource mapping pattern.

13. The base station according to claim 10, wherein the processor is specifically configured to:

configure the synchronization reference signal of the base station to be transmitted at a time different from when the synchronization reference signal of the base station's synchronization source base station is transmitted, wherein the synchronization reference signal of the base station is used for UE downlink synchronization and the synchronization reference signal of the base station's synchronization source base station is used for inter-station synchronization.

14. The base station according to claim 11, wherein the processor is further configured to:

when a synchronization level of the base station is different from the synchronization level of another base station, and the difference value is minor than a preset threshold which is bigger than 1, configure the synchronization reference signal of the base station to be transmitted at a time different from when a synchronization reference signal of the other base station is transmitted; or, when a difference value of the synchronization level of the base station and the synchronization level of the other base station is bigger than or equal to the preset threshold which is bigger than 1, configure the synchronization reference signal of the base station to be transmitted at the same time when the synchronization reference signal of the other base station is transmitted; or, when the synchronization level of the base station and the synchronization level of the other base station are the same, configure the synchronization reference signal of the base station to be transmitted at the same time or at a time different from when the synchronization reference signal of the other base station is transmitted.

15. The base station according to claim 10, further comprising:
a transceiver, configured to receive a notification signaling sent from another base station;
the processor is specifically configured to determine the base station itself as the synchronization source base station when the transceiver receives the notification signaling sent from another base station; or, determine the base station itself as the synchronized base station when the transceiver does not receive a notification signaling from other base station; and
wherein the other base station is a base station which takes the present base station as the synchronization source base station.

16. The base station according to claim 15, wherein, the synchronization status further comprises a synchronization level, and the processor is further configured to:
when the base station is the synchronization source base station, determine the synchronization level of the base station itself according to the synchronization level of the base station's synchronization source base station, wherein a difference value of the synchronization level of the base station and the synchronization level of the base station's synchronization source base station is 1.

17. The base station according to claim 10, the processor is further configured to:
detect periodically a synchronization obtaining reference signal, and reselect the base station's synchronization source base station according to the synchronization obtaining reference signal detected; or, after reselecting the synchronization source base station, transmit a signaling for releasing a synchronization relationship to the previously selected synchronization source base station; or, after being taken as the synchronization source base station and detecting that all synchronization relationships of the base station itself are released, transfer the synchronization status of the base station itself from the synchronization source base station to the synchronized base station; or, after being taken as the synchronized base station and receiving a notification signaling from another base station, transfer the synchronization status of the base station itself from the synchronized base station to the synchronization source base station, wherein the other base station is a base station which takes the present base station as the synchronization source base station.

18. The base station according to claim 10, wherein,
when a system which the base station belongs to is a long term evolution LTE time division duplex TDD system, the inter-station synchronization reference signal is transmitted in a guard period in a specific subframe; or,
when a system which the base station belongs to is an LTE system, the inter-station synchronization reference signal is transmitted in a multi-broadcast single frequency network MBSFN subframe.

* * * * *